Feb. 11, 1941.  G. A. DE VLIEG  2,231,257
ROTARY CUTTER
Filed March 8, 1937
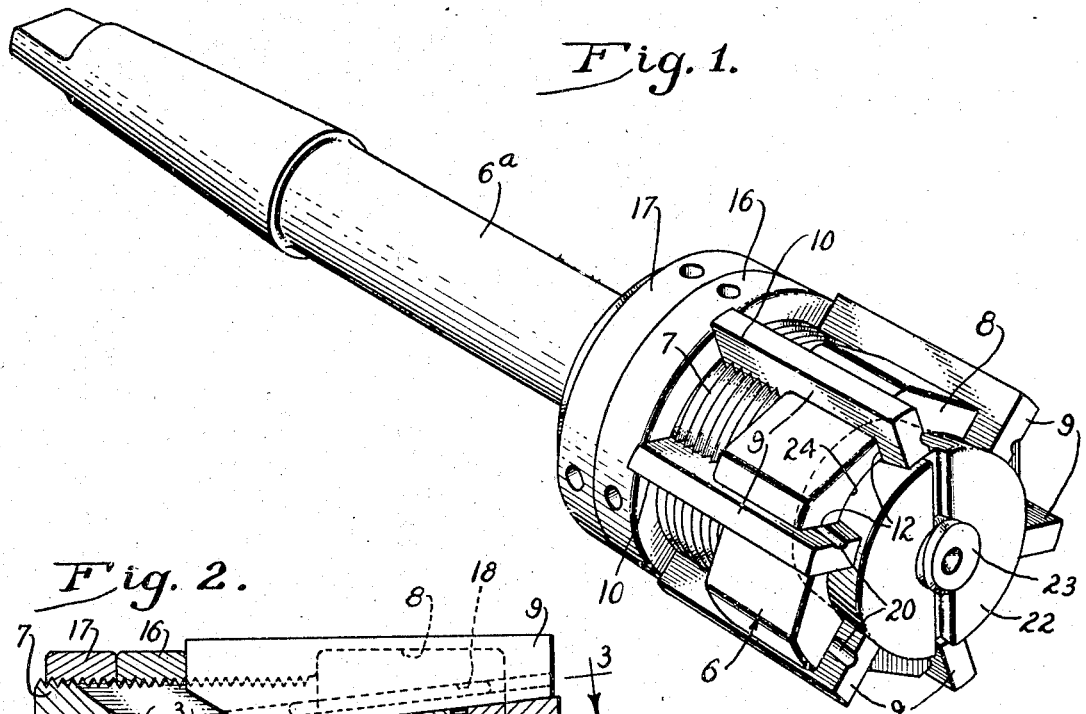
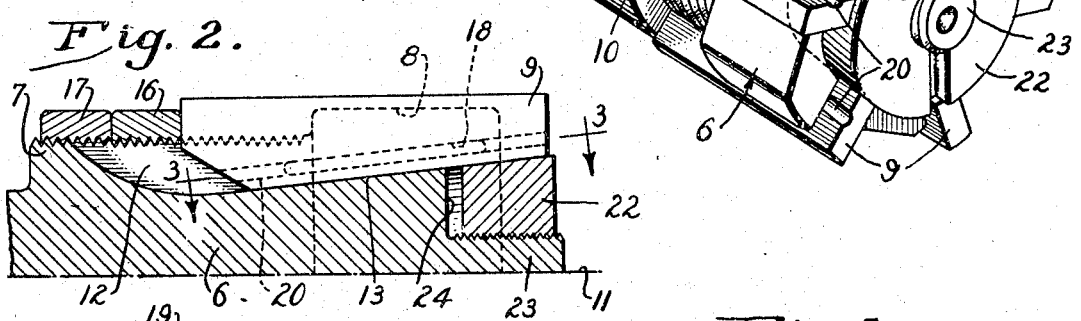
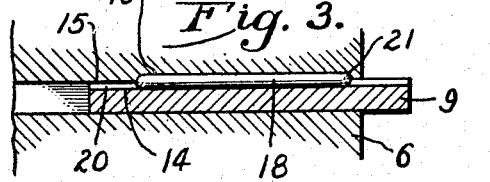
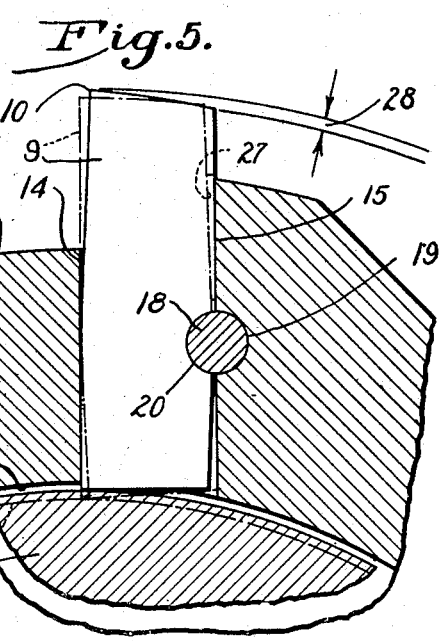
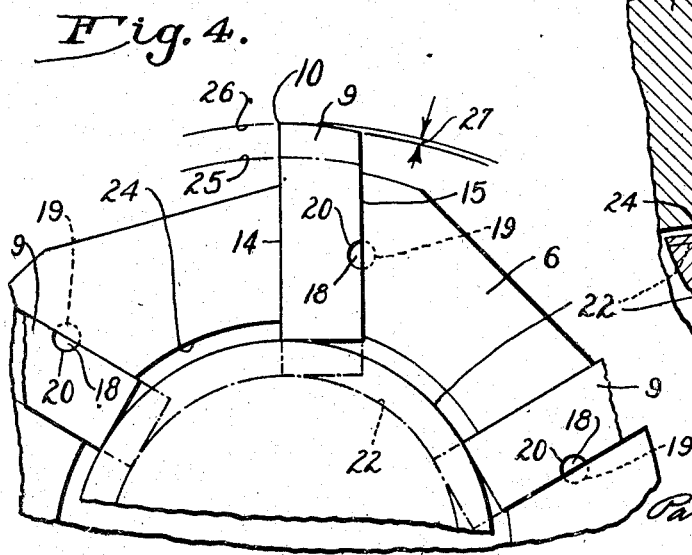
INVENTOR
Gerard A. DeVlieg
BY
Parker, Carlson, Pitzner & Hubbard
ATTORNEYS Patented Feb. 11, 1941

2,231,257

UNITED STATES PATENT OFFICE 2,231,257

ROTARY CUTTER

Gerard A. De Vlieg, Rockford, Ill.

Application March 8, 1937, Serial No. 129,563

11 Claims. (Cl. 77—75.5)

The present invention relates to improvements in rotary cutters adapted for metal removing operations, and has particular reference to a new and improved cutter with renewable cutting elements.

One of the objects of the invention resides in the provision of a rotary cutter having novel means for positioning and clamping the cutting elements.

Another object is to provide a new and improved rotary cutter in which the cutting elements are adjustable to provide a cutting clearance.

A more specific object resides in the provision of a novel reamer having a plurality of blades longitudinally adjustable to vary the cylinder of revolution of the cutting edges, and angularly adjustable to obtain a cutting clearance.

A general object is to provide a new and improved reamer which is simple and inexpensive in construction and which may be sharpened quickly, accurately, and uniformly.

Further objects and advantages will become apparent as the description proceeds.

In the accompanying drawing,

Figure 1 is a perspective view of a cutter embodying the features of my invention.

Fig. 2 is a fragmentary axial sectional view of the cutter.

Fig. 3 is a fragmentary sectional view taken substantially along line 3—3 of Fig. 2.

Fig. 4 is a fragmentary outer end view of the cutter.

Fig. 5 is a fragmentary transverse sectional view of a cutter constituting a modified form of the invention.

Referring more particularly to the drawing, the rotary cutter, constituting the exemplary embodiment of the invention, is in the form of a reamer comprising a body 6 which may be provided with a shank 6ª on one end for connection to a suitable power drive. The body 6 may be provided in various forms, and in the present instance, has a screw-threaded cylindrical inner end portion 7 and an enlarged outer end portion 8.

A plurality of cutting elements 9 are removably and adjustably mounted on the body 6. These elements are in the form of flat elongated blades with longitudinal cutting edges 10 defining a cutting cylinder of revolution, and are arranged to extend generally longitudinally of the body 6 and in peripherally spaced relation about the body axis 11. Within its broad aspects, the invention is not limited to any particular number, generally longitudinal direction, or spacing of the blades 9. In the present instance, the blades 9 extend parallel to the body axis 11 and are uniformly spaced.

To provide means for mounting the blades 9, the body 6 is formed in the periphery with a like number of suitable slots or recesses 12. Each of the recesses 12 has a bottom or root surface 13 and parallel front and back surfaces 14 and 15 adapted for engagement respectively with the corresponding surfaces of the associated blade 9. It will be understood that the blades 9 are inserted into the recesses 12 with a snug sliding fit, and that the sections of the outer end portion 8 of the body 6 serve to provide a rigid and substantial backing for the rear blade surfaces. Preferably, these spaced body sections are cut away adjacent the front faces of the blades 9 to provide a large chip clearance.

The body 6 and the blades 9 are so constructed that longitudinal adjustment of the blades in the recesses 12 will effect radial adjustment of the cutting edges 10 to vary the cutting diameter, as desired for different work requirements or preparatory for grinding to resharpen after wear. More particularly, the root surfaces are inclined inwardly from the front end of the body and radially toward the axis 11, with a runout at the rear end, and the bottom surfaces of the blades 9 are similarly inclined for full surface contact therewith.

The longitudinal adjustment of the blades 9 is determined by a ring 16 adjustably threaded on the body portion 7 and adapted for engagement with the inner ends of the blades. A lock ring 17 is also threaded on the body portion 7, and is adapted to be turned into locking engagement with the adjusting ring 16.

The blades 9 are held in radial position by suitable longitudinal guide or key members 18 preferably in the form of cylindrical spline pins. Referring particularly to Figs. 3 and 4, each recess 12 is formed in one side surface, for example the backing surface 15, with a generally longitudinal groove 19 complementary to and adapted slidably to receive the associated guide pin 18, and the contiguous surface of the blade 9 is formed with a similar opposed groove 20. The groove 19 is just long enough to receive the pin 18 and hold it against longitudinal movement, and hence terminates just short of the outer end of the recess 12 as indicated at 21, while the groove 20 extends throughout the length of the blade 9. To permit longitudinal adjustment of the blades 9 and a resultant radial adjustment, the grooves 19 and 20 and hence the pins 18 are inclined to the body axis 11. In the present instance, the pins 18 and grooves 19 and 20 extend parallel to the bottom surfaces of the blades 9 and also the root surfaces 13 of the recesses 12 so that these surfaces are always substantially in engagement.

Wedge means is provided for coacting with the pins 18 to lock the blades 9 securely in position of adjustment. One of the features of the invention resides in providing a single or unitary wedge member 22 for simultaneously clamping all of the blades 9. In the preferred form, the wedge member 22 is an axially disposed cone adjustably threaded onto a stem 23 rigid with the outer end of the reamer body 6 for engagement with the bottom surfaces of the blades 9 adjacent the outer ends. The stem 23 extends axially of a conical concentric bore 24 formed in the outer end of the body 6 and intersecting the outer ends of the recesses 12. Hence, the root surfaces 13 terminate short of the outer ends of the recesses 12 to expose a greater length of the outer ends of the blades 9 to the cone wedge 22 without a corresponding reduction in the area of the backing surfaces 15. It will be evident that the cone wedge 22 upon being adjusted inwardly will urge the blades 9 outwardly against the pins 18 to obtain a tight lock. When the surfaces 14 and 15 are in close fitting engagement with the sides of the blades 9, as in Fig. 4, the locking thrust exerted by the wedge 22 will be transmitted to the pins 18 substantially in the planes of the backing surface 15.

Since the unitary wedge 22 engages the bottom surfaces, and not the outer ends, of the blades 9, it will always occupy substantially the same axial clamping position regardless of the longitudinal adjustment of the blades, and does not restrict the length of the blades in any way. Hence, the blades need not be of uniform length, and need not project equally from the outer end of the body 6. Indeed, the outer ends of the blades 9 may be projected longitudinally beyond the wedge 22, and adapted for end cutting. Also, no specially formed surfaces, such as dovetails or end bevels, for engagement by the wedge 22, need be provided. Preferably, the cone surface is inclined at the same angle as the bottom surfaces of the blades 9 so as to engage the latter with line contact.

Another feature of the invention resides in the provision of a novel reamer in which all of the blades 9 may be ground simultaneously for cutting dimension and relief in one operation, instead of requiring a separate relief grinding operation after a cylindrical grinding operation. To this end, the leading surfaces 14 of the recesses 12 and hence the front faces of the blades 9 are disposed to extend radially of the body 6. In the sharpening operation, the cone wedge 22 is released, and then the blades 9 are adjusted inwardly to define a smaller diameter than the desired cutting diameter. In fact, the blades 9 may be adjusted into their extreme contracted position as indicated in dotted outline in Fig. 4. Then, the cone wedge 22 is tightened, and the blades 9 are ground cylindrically. As a result, the top surfaces of the blades 9 will be coincident with a cylinder of revolution 25 of a relatively large curvature, and the cutting edges 10 will be formed uniformly and accurately but without back or eccentric relief. Now, the blades 9 are adjusted outwardly to the desired cutting diameter. As a result, the cutting edges 10 will lie in a cutting cylinder of revolution 26 of a relatively small curvature so that the top surfaces of the blades 9 will recede inwardly to define a cutting relief or clearance 27. After adjustment of the blades 9 to the desired diameter, the wedge 22 is tightened, and provides a solid support at the point of cut. Since the unitary cone wedge 22 engages all of the blades 9 simultaneously, it will clamp the latter with equal pressures so that the uniformity in cutting diameter of the cutting edges 10 will be maintained. In general, the reamer may be quickly and accurately ground to provide a uniform cutting diameter and relief either in sharpening or resharpening.

In the cylindrical grinding of intermittently spaced elements, particularly when made of certain hard materials, such for example as carboloy, there is a likelihood that a small negative clearance at the cutting edges may result due to the grinding element dropping off at the cutting faces. In the modified form of Fig. 5, such negative clearance may be offset by slightly tilting the blades 9 about the pins 18. More particularly, the blades 9 are made slightly narrower than the recesses 12. For cylindrical grinding, suitable shims 27 are removably inserted between the blades 9 and the backing surfaces 15 so as to hold the cutting faces radially against the surfaces 14 as indicated in dotted outline in Fig. 5. After the grinding operation, the shims 27 are removed, and the blades 9 are adjusted into the desired longitudinal position. The cone wedge 22, which engages the leading edges of the bottom surfaces of the blades 9, is now tightened, and serves the dual function of tilting the blades 9 rearwardly about the pins 18, and clamping the blades in position against the pins and the backing surfaces 15 of the recesses 12, as indicated in full outline in Fig. 5.

As a result, the cutting edges 10 are provided with an eccentric clearance 28 obtained in part by longitudinal adjustment and in part by tilting of the blades 9. It will be understood, however, that a cutting clearance is obtainable without longitudinal adjustment and merely by tilting the blades 9.

The reamer permits of a quick and convenient method for accurately sharpening the blades. The reamer can be ground considerably undersize without objection since the blades may thereafter be adjusted to the desired size with eccentric cutting clearance.

I claim as my invention:

1. A rotary cutter comprising, in combination, a rotary body, a plurality of peripherally spaced generally longitudinal recesses formed in said body, a plurality of blades disposed in said recesses, longitudinal guide means for confining said blades against radial movement outwardly in any longitudinal position, and a single unitary wedge means adjustably mounted on said body for simultaneous engagement with all of said blades to clamp said blades outwardly against said guide means.

2. A rotary cutter comprising, in combination, a rotary body, a plurality of peripherally spaced recesses in said body, a plurality of cutting blades disposed in said recesses, longitudinal guide means for locating said blades radially in said recesses, and a single unitary wedge means adjustably mounted on said body for simultaneously clamping all of said blades in position.

3. A rotary cutter comprising, in combination, a rotary body, a plurality of peripherally spaced generally longitudinal recesses formed in said body, a plurality of blades disposed for longitudinal and radial adjustment in said recesses and projecting from one end of said body, longitudinal guide means for confining said blades against radial movement outwardly in any longitudinal position, and a single unitary wedge adjustably mounted on said end of said body for simultaneous engagement with the bottom surfaces of all of said blades to clamp said blades radially outwardly against said guide means.

4. In a rotary cutter, in combination, a rotary body formed in the periphery with a generally longitudinal recess having parallel side surfaces with the leading surface disposed substantially radially and having a bottom surface inclined to the axis of rotation, a flat sided cutting blade slidably disposed in said recess for longitudinal and radial adjustment and having a bottom surface complementary to and adapted for sliding engagement with said bottom surface and having a top surface of a segmental cylindrical form of predetermined curvature concentric to the axis of said body in one predetermined longitudinal position of said blade, guide means coacting with said body and said blade for confining said blade against radial withdrawal in any longitudinal position of adjustment, and clamp means coacting with said body and said blade for urging said blade radially outward into locking engagement with said guide means in any position of longitudinal adjustment, whereby said blade may be adjusted from said one predetermined position and clamped with the cutting edge describing an increased cylinder of revolution of smaller curvature than said first mentioned curvature to cause said top surface to define an eccentric relief.

5. In a rotary cutter, in combination, a rotary body formed in the periphery with a generally longitudinal recess located parallel to and substantially to one side of a radius of said body, a complemental cutting blade slidably disposed in said recess for longitudinal and radial adjustment and having a top surface of a segmental cylindrical form of predetermined curvature concentric about the axis of said body when said blade is located in a position of relatively reduced radial adjustment, guide means coacting with said body and said blade for confining said blade against radial withdrawal in any longitudinal position, and clamp means coacting with said body and said blade for urging said blade radially into locking engagement with said guide means in any position of longitudinal adjustment, whereby said blade may be clamped in a position of relatively increased radial adjustment with the cutting edge describing a cylinder of revolution of smaller curvature than said mentioned curvature to cause said top surface to define an eccentric relief.

6. A rotary cutter comprising, in combination, a body formed in the periphery with a plurality of uniformly spaced generally longitudinal recesses having bottom surfaces inclined to the axis of rotation, and formed with an axial bore in the outer end intersecting the outer ends of said bottom surfaces, an axial stud formed on said body and projecting outwardly through said bore, a plurality of blades slidably disposed in said recesses for longitudinal and radial adjustment, guide means coacting with said body and said blades for confining said blades against radial movement outwardly in any longitudinal position and for causing radial adjustment in response to longitudinal adjustment, and a cone wedge threaded on said stud for engagement with the bottom surfaces of the outer end portions of said blades to clamp said blades radially outwardly against said guide means.

7. A rotary cutter comprising, in combination, a body formed in the periphery with a plurality of generally longitudinal recesses having bottom surfaces inclined to the axis of rotation, and formed with an axial bore in the outer end intersecting the outer ends of said bottom surfaces, a plurality of blades slidably disposed in said recesses for longitudinal and radial adjustment, guide means coacting with said body and said blades for causing radial adjustment in response to longitudinal adjustment, and a cone wedge threaded to said body within said bore for engagement with the bottom surfaces of the outer end portions of said blades to clamp said blades radially outwardly against said guide means.

8. In a rotary cutter, in combination, a body having a generally longitudinal recess with the leading side disposed substantially in an axial plane, with the parallel trailing side, and with a perpendicular root surface longitudinally inclined to the axis of rotation, a longitudinal groove in said parallel side and extending parallel to said root surface, a blade slidably disposed in said recess and having a longitudinal groove in its rear surface opposed to said first mentioned groove, a spline pin disposed in said grooves, said blade being less in thickness than the width of said groove, to permit the blade to be tilted about said pin into engagement with said leading side during a sharpening or regrinding operation, and a wedge mounted on said body and coacting with the bottom surface of said blade to tilt said blade with a clamping pressure about said pin into engagement with said parallel side to condition the blade for a cutting operation.

9. In a rotary cutter, in combination, a body having a generally longitudinal recess with the leading side disposed substantially in an axial plane, with the parallel trailing side, and with a perpendicular root surface, a longitudinal groove in said parallel side and extending parallel to said root surface, a blade slidably disposed in said recess and having a longitudinal groove in its rear surface opposed to said first mentioned groove, a spline pin disposed in said grooves, said blade being less in thickness than the width of said groove, and a wedge mounted on said body and coacting with the bottom surface of said blade to tilt said blade with a clamping pressure about said pin into engagement with said parallel side.

10. In a rotary cutter, in combination, a body having a recess therein, a blade removably mounted in said recess and having a longitudinal cutting edge, and means for tilting said blade in said recess to provide said edge with an eccentric clearance, and for clamping said blade in tilted position.

11. In a rotary cutter, in combination, a body having a recess therein, a blade removably mounted in said recess and having a longitudinal cutting edge, and wedge means coacting with the bottom of said blade to tilt said blade in said recess about the cutter axis and to clamp said blade in tilted position.

GERARD A. DE VLIEG.